US007917147B2

(12) United States Patent
Bond

(10) Patent No.: US 7,917,147 B2
(45) Date of Patent: Mar. 29, 2011

(54) METHOD OF MONITORING PERFORMANCE, PERFORMANCE MONITORING SYSTEM, AND NETWORK PERFORMANCE MONITORING APPARATUS

(75) Inventor: David Bond, Maidenhead (GB)

(73) Assignee: JDS Uniphase Corporation, Milpitas, CA (US)

( * ) Notice: Subject to any disclaimer, the term of this patent is extended or adjusted under 35 U.S.C. 154(b) by 731 days.

(21) Appl. No.: 11/603,501

(22) Filed: Nov. 22, 2006

(65) Prior Publication Data
US 2007/0123250 A1  May 31, 2007

(30) Foreign Application Priority Data
Nov. 30, 2005  (GB) .................................. 0524365.4

(51) Int. Cl.
H04W 40/00 (2009.01)
H04W 24/00 (2009.01)
H04B 17/00 (2006.01)
G06F 7/00 (2006.01)
G06F 17/00 (2006.01)

(52) U.S. Cl. ...................... 455/446; 455/423; 455/67.11; 455/456.1; 455/456.2; 707/665; 707/667; 707/668

(58) Field of Classification Search .......... 455/423–425, 455/454.1–457, 466, 67.11–67.13, 69, 343.1–343.6, 455/445, 428, 522, 572–574; 707/665, 667, 707/668
See application file for complete search history.

(56) References Cited

U.S. PATENT DOCUMENTS

| 6,298,233 | B1* | 10/2001 | Souissi et al. | 455/423 |
| 6,442,393 | B1 | 8/2002 | Hogan | 455/456 |
| 7,010,329 | B2* | 3/2006 | Livet et al. | 455/574 |
| 2004/0058652 | A1* | 3/2004 | McGregor et al. | 455/67.13 |
| 2004/0097237 | A1 | 5/2004 | Aoyama | 455/445 |
| 2004/0152362 | A1 | 8/2004 | Carter et al. | 439/660 |
| 2004/0176040 | A1 | 9/2004 | Thornton et al. | 455/67.11 |
| 2007/0004396 | A1* | 1/2007 | Connelly | 455/423 |

FOREIGN PATENT DOCUMENTS

| EP | 1 284 579 | 2/2003 |
| GB | 2 360 173 | 9/2001 |
| WO | WO 02/071780 | 9/2002 |

* cited by examiner

Primary Examiner — Un C Cho
(74) Attorney, Agent, or Firm — Perman & Green, LLP

(57) ABSTRACT

A method of monitoring performance of a communications network supporting a plurality of communications devices comprises providing a number of the plurality of the communications terminals with respective software agents to make respective measurements in relation to an attribute of a communications service supported by the communications network. The number of the plurality of communications terminals is equipped with position determination capabilities so as to provide global position information with respect to a measurement made. The measurement made and the corresponding location is communicated to a performance processing application that supports a database and stored by the performance processing application in the database, thereby recording a representation of a variation of the attribute of the communications service with respect to location.

11 Claims, 3 Drawing Sheets

US 7,917,147 B2

METHOD OF MONITORING PERFORMANCE, PERFORMANCE MONITORING SYSTEM, AND NETWORK PERFORMANCE MONITORING APPARATUS

TECHNICAL FIELD

The present invention relates to a method of monitoring performance of a communications network of the type, for example, that supports a communications service over a network coverage area provided by the communications network for a plurality of communications terminals. The present invention also relates to a performance monitoring system of the type, for example, that comprises a communications network supporting a communications service over a network coverage area provided by the communications network for a plurality of communications terminals. The present invention further relates to a network performance monitoring apparatus of the type, for example, that receives data from communications terminals and stores the data received in a database.

BACKGROUND ART

In the field of mobile communications, so-called "drive testing" is a technique of choice used by network operators to determine the performance of a so-called "home" network. Drive testing involves sending road-vehicles into cell coverage areas of networks to test, inter alia signal strength. Typically, the road-vehicles are equipped with costly and bulky equipment, which is used to test the signal strength and provide other metrics. Indeed, drive testing is a procedure that is labour-intensive and not particularly comprehensive. In this respect, a Radio Frequency (RF) field is undersampled in time, since each sample covers only a fraction of a second per month at any one location. Another disadvantage of drive testing is that the RF field is also undersampled in space, since most major roads are not driven their entire length and only some of the minor roads are driven. Consequently, drive testing misses all locations without a road, for example parks, stadiums, homes, offices, and/or conference centres. Omission of testing in such areas is disadvantageous as users of communications terminals are likely to be located in such areas. Likewise, users are less likely to reside in some other areas covered by a given drive test. Further, users of mobile communications terminals are known to "roam" from the home network to a so-called "foreign" or "visited" network. The visited network need not necessarily be located in a different country to the home network; it can be a network of a partner network operator and located in the same country as the home network. Additionally, irrespective of the location on the globe of a given mobile communications terminal, it is desirable for network operators to possess information concerning performance of a given network in which the given mobile communications terminal is located when used. However, an operator of the home network is not usually privy to such information in relation to the visited networks.

DISCLOSURE OF INVENTION

According to a first aspect of the present invention, there is provided a method of monitoring performance of a communications network providing a coverage area for a plurality of communications terminals, a number of the plurality of communications terminals respectively supporting a number of measurement applications, the number of the plurality of communications terminals each being capable of self-location determination, the method comprising: the number of the measurement applications each respectively obtaining rules from a processing resource; the number of the plurality of communications terminals each determining respective location data identifying a respective location thereof; the number of the measurement applications each respectively evaluating the rules and performing a measurement at the respective location thereof within the coverage area of the communications network in response to the evaluation of the rules relating to the need to perform the measurement, the measurement relating to an attribute of a communications service; and the number of the plurality of communications terminals each communicating the respective location data and the associated measurement to the processing resource via the communications network.

The measurement may relate to an objective criterion associated with provision of the communications service. The objective criterion may relate to a Quality of Service metric. The measurement may relate to an ability to use one or more of the number of the plurality of communications terminals.

The measurement may relate to a network performance parameter. The number of the plurality of communications terminals may each have a respective physical communication associated therewith. The network performance parameter may relate to the physical communications. The respective physical communication may relate to a physical layer of a protocol stack.

The physical communications may relate to communications terminal—base station wireless communications.

The measurement may. relate to any one of: a call hold time for a voice call; a call setup time for the voice call; call blocking associated the voice call; message integrity for an e-mail message; a message send time for the e-mail message; a message delivery time for the e-mail message; availability of the e-mail service; an upload peak rate for a data service; a download peak rate for the data service; an upload sustained rate for the data service; a download sustained rate for the data service; a round-trip time for the data service; jitter associated with the data service; availability of the data service; a stream setup time for streamed media; a sustained download rate for the streamed media; jitter associated with the streamed media; availability of a streamed media service; or signal strength.

The streamed media may be streamed audio and/or video.

The each of the number of measurement applications may be an application for reporting network measurement data to the processing resource.

The each of the number of measurement applications may be a software agent.

The each of the number of the plurality of communications terminals may be capable of determining a global position thereof. The each of the number of the plurality of communications terminals may comprise a Global Positioning Satellite (GPS) receiver.

The method may further comprise the step of: the processing resource receiving the respective location data and the associated measurement and structurally storing the respective location data and the associated measurement, thereby contributing to a database of locations and measurements associated therewith.

The processing resource may support a data processing application. The data processing application may support the database.

The locations and measurements associated therewith may constitute a spatial profile of the attribute of the communications service.

The data processing application may be arranged to represent graphically, when in use, the spatial profile.

According to a second aspect of the present invention, there is provided a computer program code element comprising computer program code means to make a computer execute the method as set forth above in relation to the first aspect of the invention.

The computer program code element may be embodied on a computer readable medium.

According to a third aspect of the present invention, there is provided a performance monitoring system comprising: a communications network arranged to provide, when in use, a coverage area for a plurality of communications terminals, a number of the plurality of communications terminals respectively supporting, when in use, a number of measurement applications, the number of the plurality of communications terminals each being capable of self-location determination; wherein the number of the measurement applications is each arranged respectively to obtain rules from a processing resource; each of the number of the plurality of communications terminals is arranged, when in use, to determine respective location data identifying a respective location thereof; the number of the measurement applications is each arranged respectively to evaluate, when in use, the rules and to perform a measurement at the respective location thereof within the coverage area of the communications network in response to the evaluation of the rules resulting in a need to perform the measurement at the respective location, the measurement relating to an attribute of a communications service; and the each of the number of the plurality of communications terminals is each further arranged to communicate, when in use, the respective location data and the associated measurement to the processing resource via the communications network.

According to a fourth aspect of the present invention, there is provided a network performance monitoring apparatus comprising: a processing resource arranged to provide rules to a number of measurement applications respectively supported by a number of a plurality of communications terminals, the processing resource also being arranged to receive, when in use, a plurality of location data and a plurality of measurements respectively associated therewith as a result of evaluation of the rules by the number of measurement applications resulting in respective needs to perform the plurality of measurements, the plurality of measurements relating to an attribute of a communications service supported by a communications network; wherein the processing resource is further arranged to store structurally, when in use, the respective location data and the associated measurement, thereby contributing to a database of locations and measurements associated therewith.

The stored locations and measurements associated therewith may constitute a spatial profile of the attribute of the communications service.

It is thus possible to provide a method of monitoring performance, a performance monitoring system, and a network performance monitoring apparatus that constitute a relatively inexpensive technique for making measurements relating to an attribute of a communications service. Additionally, the method, system and apparatus facilitates, without increased cost, implementation of a larger scale test programme than currently employed to investigate parts of a network coverage area supported by a communications network where performance of the communications service measured is found to be below expectation as a result of using the above method, system and/or apparatus. Further, measurements can be made nationally or internationally irrespective of the location of the processing resource.

BRIEF DESCRIPTION OF DRAWINGS

At least one embodiment of the invention will now be described, by way of example only, with reference to the accompanying drawings, in which.

DETAILED DESCRIPTION

Figure 1:
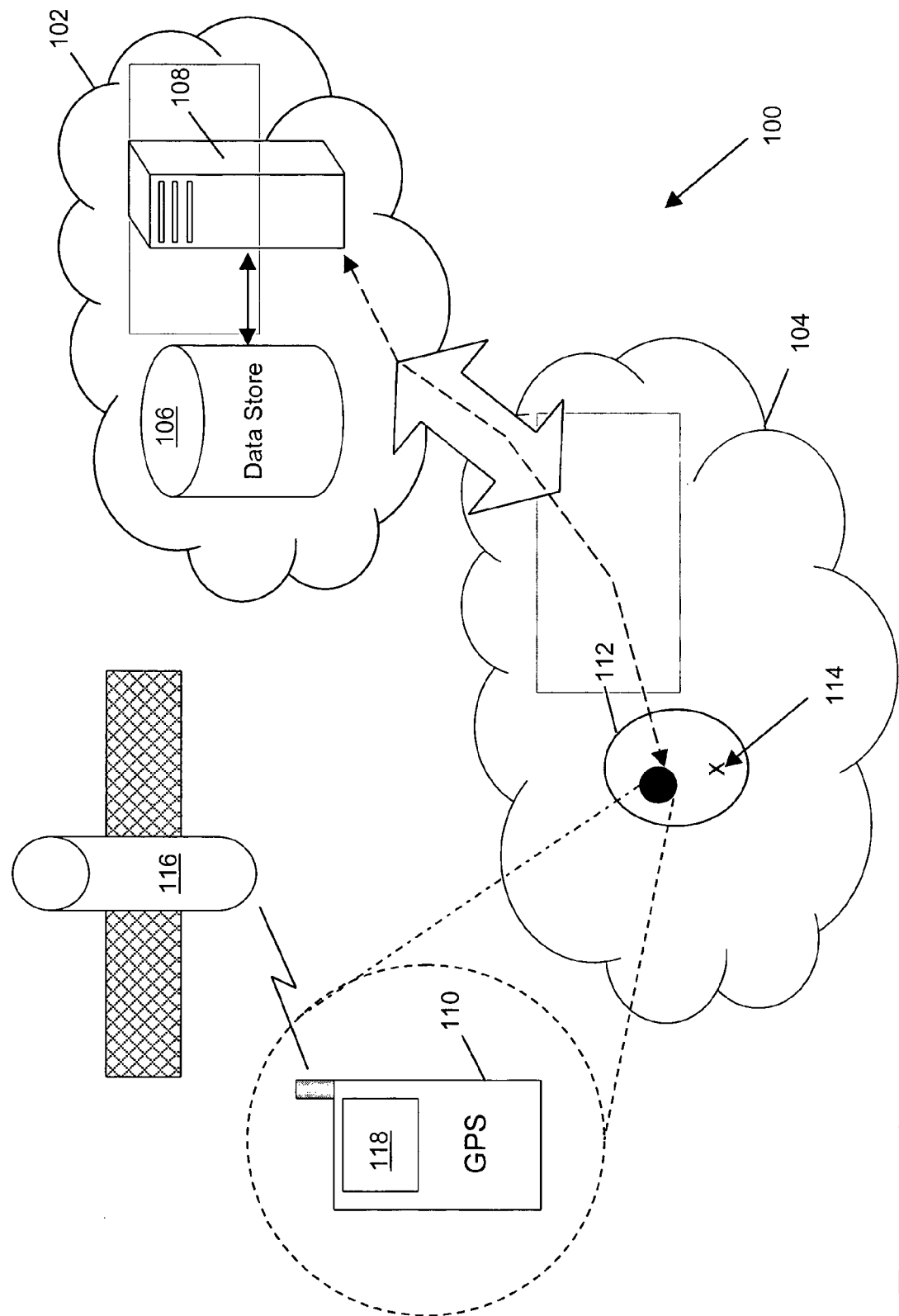
FIG. 1 is a schematic diagram of a communications system constituting an embodiment of the invention.

Throughout the following description identical reference numerals will be used to identify like parts.

Referring to FIG. 1, a communications system 100 comprises a first communications network 102 capable of communicating with a second communications network 104. In this example, the first communications network 102 is a Local Area Network (LAN) and the second communications networks 104 is a Global System for Mobile communications (GSM) network.

A monitoring server 108, constituting a processing resource, is coupled to the first communications network 102, and supports a database 106 for storing associations between measured data and data corresponding to physical locations. A data processing application, in this example a performance processing application, is also supported by the monitoring server 108, and also supports the database 106. The monitoring server 108 also comprises an output device (not shown) supporting a Graphical User Interface (GUI) 300 for displaying results of analysis. In this respect, the data processing application comprises analysis tools for mining the database 106 and generating information indicative of a measure performance of one or more communications service supported by the second communications network 104.

In this example, the one or more communications service is any one or more of: a data service, an e-mail service, a streamed media service, and/or a voice call service.

A first mobile communications terminal 110 is located within a local coverage area of the second communications network 104, for example a cell 112, supported by a base station 114. As will be appreciated by the skilled person, the second communications network 102 comprises a plurality of base stations (not shown), together providing a network coverage area; the base station 114 is one of the plurality of base stations. In this example, the first mobile communications terminal 110 is one of a number of a plurality of communications terminals (not shown) located within the cell 112 of the second communications network 104. The first mobile communications terminal 110 is equipped with global location determining hardware and software, for example, a Global Positioning Satellite (GPS) receiver. Consequently, the first mobile communications terminal 110 is capable of receiving signals from a number of satellites 116, for example at least three satellites, such as six satellites, for triangulation purposes. The first mobile communications terminal 110 also supports a first software agent application 118.

Figure 2:
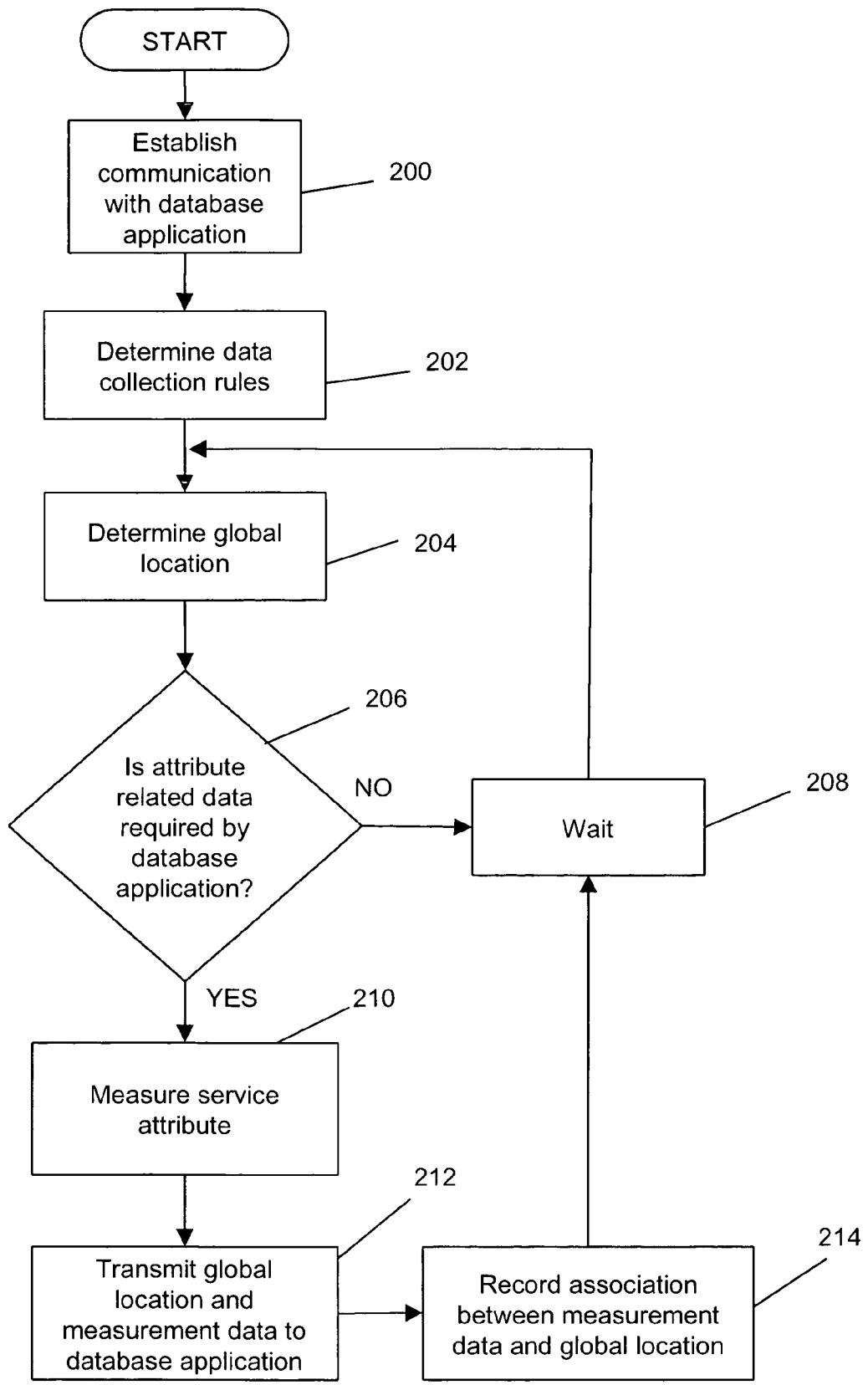
FIG. 2 is a flow diagram of a method for use with the system of FIG. 1.

In operation (FIG. 2), in order to populate the database 106 supported by the performance processing application, the first agent 118 residing on the first mobile communications terminal 110 firstly establishes (Step 200) a communication with the performance processing application via the second and first communications networks 104, 102. The performance processing application then determines rules for making location measurements by obtaining (Step 202), in this example, the rules from the database 106. The first agent 118 of the first mobile communications terminal 110 then, using the GPS receiver of the first mobile communications terminal 110, determines (Step 204) a global position of the first mobile terminal 110.

If desired, in order to reduce loading of the monitoring server 108 and/or conserve battery charge of mobile terminals, one of the rules for making the location measurement can be a threshold associated with a measurement relating to a communications terminal, for example signal strength, a location of where a application is being used, battery level, or memory level. In such an example, one or more agent, for example the first agent 118, only determines the global position in response to a threshold being exceeded (go beyond).

Once global position data has been obtained by the first agent 118, the first agent 118 evaluates the rules acquired in relation to the global position data obtained and determines (Step 206) whether the evaluation of the rules in relation to the global position data results in a need to make one or more measurement in relation to one or more respective attribute of a predetermined communications service supported by the communications network 100, for example, a rule to make a measurement relating to a predetermined attribute of the predetermined communications service when located in a predetermined part of the network coverage area, can be implemented. The rules can also be configured by the performance processing application, based upon a predetermined threshold, to reflect the fact that: the performance processing application considers the database 106 to contain sufficient measurements in relation to the predetermined communications service at or within a predetermined area where the mobile communications terminal 110 is located; or the database 106 contains insufficient measurements in relation to the global location data corresponding to the mobile communications terminal 110. Typically, the latter state prevails, since the layouts of communications networks change regularly over time. If no data is deemed by the performance processing application to be required, evaluation of the rules yields a negative result and the first agent 118 waits (Step 208) until the global position of the first mobile communications terminal 110 changes. Thereafter, the above described steps are repeated. Although not shown in FIG. 2, the first agent 118 can be configured to refresh periodically the rules acquired.

If the evaluation of the rules results in a determination that one or more measurement needs to be made in relation to the current global location data corresponding to the first mobile communications terminal 110, the first agent 118 makes a measurement (Step 210) in relation to the predetermined attribute of the predetermined communications service.

The predetermined attribute is, in this example, an objective criterion associated with provision of the communications service. The objective criterion relates to a quality of the predetermined communications service being provided. In the present example, the measurement is a reflection of an ability of the user to use, via the first communications terminal 110, the predetermined communications service. Of course, the ability to use typically relates to one or more of the number of the plurality of communications terminals.

In some examples, the measurement relates to a network performance parameter, for example of physical communications respectively associated with the number of the plurality of communications terminals. Typically, the physical communications relates to a physical layer of a protocol stack for supporting communications between communications terminals and base stations.

Examples of the predetermined attribute being measured include: a call hold time for a voice call; a call setup time for the voice call; call blocking associated the voice call; message integrity for an e-mail message; a message send time for the e-mail message; a message delivery time for the e-mail message; availability of the e-mail service; an upload peak rate for a data service; a download peak rate for the data service; an upload sustained rate for the data service; a download sustained rate for the data service; a round-trip time for the data service; jitter associated with the data service; availability of the data service; a stream setup time for streamed media; a sustained download rate for the streamed media; jitter associated with the streamed media; availability of a streamed media service; and/or signal strength. In relation to measurements concerning streamed media, the streamed media can be streamed audio and/or video.

After the measurement has been made, the first agent 118 communicates (Step 212) the global position and the measurement data acquired to the performance processing application, the performance processing application structurally recording (Step 214) an association between the measurement data and the global location data received.

The first agent 118 then waits (Step 208) until the first network data changes using the same criterion mentioned above. Thereafter, the above described steps are repeated. Further, the above described steps are repeated in relation to the other mobile communications terminals (not shown) amongst the number of the plurality of communications terminals that are equipped with global location determining hardware and software, and that are capable of using the predetermined communications service. Of course, the skilled person will appreciate that the mobile communications terminal 110 equipped with global location determining hardware and software need not necessarily be located in a so-called "home" or "domestic" network to which a user of the first mobile communications terminal 110 is subscribed, rather the mobile communications terminal 110 can be roaming in other so-called "foreign" networks, or other "domestic", but foreign, networks in a same country as the second communications network 104.

Figure 3:
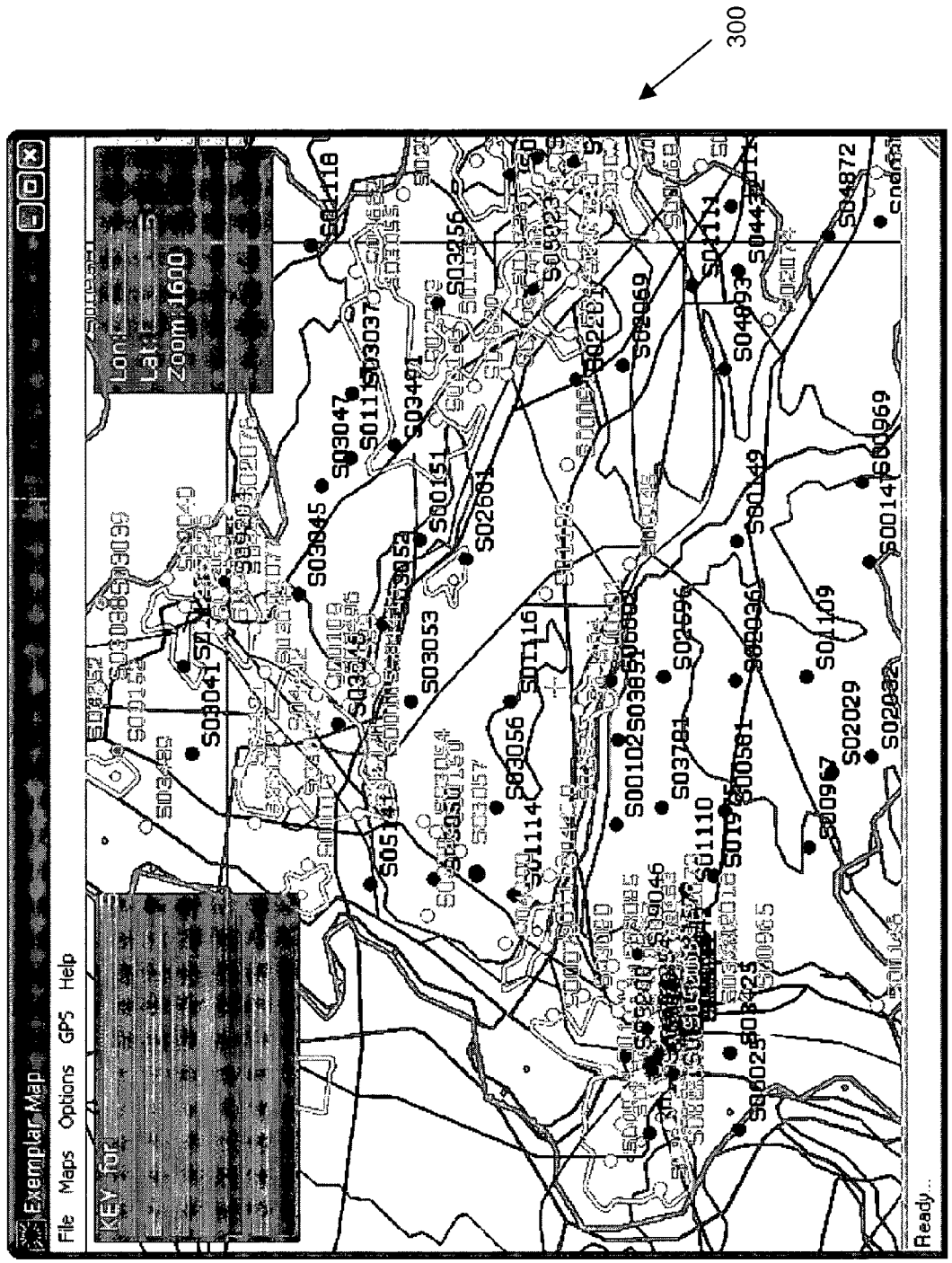
FIG. 3 is a schematic representation of a graphical user interface for use in the communications system of FIG. 1.

The contents of the database constitute a representation of the measurements made in relation to the communications service with respect to location, i.e. a spatial profile. Once the database 106 contains sufficient information to make analysis of the information meaningful, the performance processing application employs the analysis tools to provide a digest of the measurements made with respect to location. For example, referring to FIG. 3, the GUI 300 of the monitoring server 108 is used to represent, graphically, the measurements made with respect to location as contour lines of the measurements made. The skilled person will, of course, appreciate that other techniques exist for representing, with respect to location, the information stored in the database 106.

Alternatively or additionally, the one or more agent can be arranged to determine the global location in response to a predetermined event taking place, for example a call being dropped or receipt of an e-mail from a predetermined sender. In such an example, the one or more agent, following location determination, reports the event and the location where the event took place.

Of course, the principles of the above examples are not limited to cellular communications networks and mobile communications terminals. In this respect, the principles of the above example can be applied to other environments, for example cable television networks and set-top boxes, games consoles, so-called Zigbee probes, security systems, DVB, DAB, DVB-H, and/or so-called "Homeland security".

Although the above examples have been described in the context of GSM networks, the skilled person will appreciate that the above embodiment can be employed in relation to other communications networks, for example Universal Mobile Telecommunications System (UMTS), Worldwide Interoperability for Microwave Access (WiMAX) or Wireless Fidelity (WiFi) networks.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

What is claimed is:

1. A method of monitoring performance of a communications network providing a coverage area for a plurality of mobile communications terminals, a number of the plurality of mobile communications terminals respectively supporting a number of measurement applications, the number of the plurality of mobile communications terminals each being capable of self-location determination, the method comprising:
    the number of the measurement applications, at the number of plurality of mobile communications terminals, each respectively obtaining rules from a processing resource;
    the number of the plurality of mobile communications terminals each determining respective location data identifying a respective location thereof;
    the number of the measurement applications each respectively evaluating the rules and performing a measurement at the respective location thereof within the coverage area of the communications network in response to the evaluation of the rules resulting in a need to perform the measurement at the respective location of the mobile communications terminal, the measurement relating to an attribute of a communications service; and
    the number of the plurality of mobile communications terminals each communicating the respective location data and the associated measurement to the processing resource via the communications network,
    wherein the rules are configured by the processing resource based upon a predetermined threshold to reflect the fact that the processing resource deems a database to contain sufficient measurements in relation to a predetermined communications service at or within a predetermined area where a communications terminal is located, or the database is deemed to contain insufficient measurements in relation to the respective communications terminal location, and
    wherein the rules are periodically refreshed.

2. The method according to claim 1, wherein the measurement relates to an objective criterion associated with provision of the communications service.

3. The method according to claim 1, wherein the measurement relates to any one of:
    a call hold time for a voice call;
    a call setup time for the voice call;
    call blocking associated the voice call;
    message integrity for an e-mail message;
    a message send time for the e-mail message;
    a message delivery time for the e-mail message;
    availability of the e-mail service;
    an upload peak rate for a data service;
    a download peak rate for the data service;
    an upload sustained rate for the data service;
    a download sustained rate for the data service;
    a round-trip time for the data service;
    jitter associated with the data service;
    availability of the data service;
    a stream setup time for streamed media;
    a sustained download rate for the streamed media;
    jitter associated with the streamed media;
    availability of a streamed media service; or
    signal strength.

4. The method according to claim 1, wherein the each of the number of measurement applications is an application for reporting network measurement data to the processing resource.

5. The method according to claim 1, wherein the rules comprise a rule to reduce loading of the processing resource and/or conserve battery charge of the number of the plurality of communications terminals.

6. The method according to claim 5, wherein the rule comprises a comparison between a threshold associated with the measurement and the measurement.

7. The method according to claim 6, wherein the threshold relates to:
    signal strength, a location of application used, a battery level, or a memory level.

8. The method according to claim 1, further comprising: the processing resource receiving the respective location data and the associated measurement and structurally storing the respective location data and the associated measurement, thereby contributing to a database of locations and measurements associated therewith.

9. A computer program code element embodied on a non-transitory computer readable medium, comprising computer program code means to make a computer execute the method according to claim 1.

10. A performance monitoring system comprising:
    a communications network arranged to provide, when in use, a coverage area for a plurality of mobile communications terminals, a number of the plurality of mobile communications terminals respectively supporting, when in use, a number of measurement applications, the number of the plurality of mobile communications terminals each being capable of self-location determination; wherein
    the number of the measurement applications is each arranged respectively to obtain rules from a processing resource;
    each of the number of the plurality of mobile communications terminals is arranged, when in use, to determine respective location data identifying a respective location thereof;
    the number of the measurement applications is each arranged respectively to evaluate, when in use, the rules and to perform a measurement at the respective location thereof within the coverage area of the communications network in response to the evaluation of the rules resulting in a need to perform the measurement at the respective location of the mobile communications terminal, the measurement relating to an attribute of a communications service; and
    the each of the number of the plurality of mobile communications terminals is each further arranged to communicate, when in use, the respective location data and the associated measurement to the processing resource via the communications network, wherein the rules are configured by the processing resource based upon a predetermined threshold to reflect the fact that the processing resource deems a database to contain sufficient measurements in relation to a predetermined communications service at or within a predetermined area where a communications terminal is located, or the database is deemed to contain insufficient measurements in relation to the respective communications terminal location, and wherein the processing resource periodically refreshes the rules.

11. A network performance monitoring apparatus comprising:

a processing resource arranged to provide rules to a number of measurement applications respectively supported by a number of a plurality of mobile communications terminals, the processing resource also being arranged to receive, when in use, a plurality of location data and a plurality of measurements respectively associated therewith as a result of evaluation of the rules by the number of measurement applications resulting in respective needs to perform the plurality measurements at respective locations of mobile communications terminals, the plurality of measurements relating to an attribute of a communications service supported by a communications network; wherein the processing resource is further arranged to store structurally, when in use, the respective location data and the associated measurement, thereby contributing to a database of locations and measurements associated therewith, wherein the rules are configured by the processing resource based upon a predetermined threshold to reflect the fact that the processing resource deems a database to contain sufficient measurements in relation to a predetermined communications service at or within a predetermined area where a communications terminal is located, or the database is deemed to contain insufficient measurements in relation to the respective communications terminal location, and wherein the processing resource periodically refreshes the rules.

* * * * *